Reissued Jan. 24, 1933

Re. 18,719

UNITED STATES PATENT OFFICE

BENJAMIN L. EICHER, OF CHICAGO, ILLINOIS, ASSIGNOR, BY MESNE ASSIGNMENTS, TO THE DR. GROSS LABORATORIES, INC., OF DAYTON, OHIO, A CORPORATION OF DELAWARE

PROCESS FOR MAKING COD-LIVER-OIL TABLETS

No Drawing. Original No. 1,552,549, dated September 8, 1925, Serial No. 712,555, filed May 12, 1924. Application for reissue filed January 15, 1926. Serial No. 81,569.

This invention relates to the manufacture of pills, more particularly pills having an oily material as one of the principal ingredients.

One of the difficulties hitherto encountered in connection with making pills is the incorporation with the other ingredients of oily materials such as cod liver oil extractives, i. e. the ethereal, alcoholic and other well known extractives of the active components of cod liver oil.

It is an object, therefore, of the present invention to provide an improved process for making pills, more particularly pills having an oil material as one of the principal ingredients.

Other and further important objects of the invention will be apparent from the disclosures in the following description, which sets forth the preferred form of the invention.

According to the preferred form of the invention reduced iron, zinc phosphide, berberine sulphate and strychnine sulphate are mixed in a ball mill with sufficient charcoal to get a thorough mixture. The balance of the charcoal desired is then added and uniformly incorporated in the mixture. Then a solution of oleoresin of ginger in ether is added and the whole thoroughly mixed.

The next step is to reduce the material into granular form which may conveniently be done by passing it through a screen. The granules so made are dried and then again passed through the screen and compressed into three and one-half grain tablets. In the compression step the pressure should not be greater than is required to make a coherent mass since the pills should be porous to absorb a solution of cod-liver oil extractives in a volatile solvent.

The pills after compression are placed in a percolator and a solution of cod-liver oil extractives in about twice their weight of ether is poured over the pills. The solution flowing through the percolator is caught and repassed through the pills until all has been absorbed. The pills are then dried at a suitable temperature to remove the volatile solvent when they are ready to coat.

The pills may conveniently be coated in a pan with simple syrup. Next a thin coating of dry powdered (granulated) acacia is applied. The pills are dried and the coating operations are repeated. After further drying they are sugar coated brown or any other desired color.

The proportion of the ingredients used is preferably kept within the following limits:

| | | Per cent | |
|---|---|---|---|
| Cod liver oil extractives | 7 | to | 30 |
| Reduced iron | 1 | to | 8 |
| Zinc phosphide | 0.5 | to | 3 |
| Berberine sulphate | 0.1 | to | 0.6 |
| Strychnine sulphate | 0.01 | to | 0.06 |
| Oleoresin of ginger | 0.1 | to | 0.6 |
| Powdered charcoal | 50 | to | 75 |

Proportions which have been found especially suitable are the following:

| | Per cent |
|---|---|
| Cod liver oil extractives | 25.300 |
| Reduced iron | 5.375 |
| Zinc phosphide | 1.380 |
| Berberine sulphate | 0.400 |
| Strychnine sulphate | 0.025 |
| Oleoresin of ginger | 0.320 |
| Charcoal | 67.200 |
| | 100.000 |

Various of these ingredients may be omitted if desired without changing the process in any way. Further, other absorbent materials than charcoal may in some cases be employed. Also other volatile solvents than ether may be used in certain cases.

It will also be evident that several of the numerous steps in the process may be omitted or modified without changing the essential principles of the invention. Thus in place of a percolator the pills and solution of cod-liver oil extractives might be placed in a tumbling barrel to incorporate the latter in the pills. A percolator is preferred, however, as there is less tendency to break the pills.

I am aware that numerous details of this process may be varied through a wide range without departing from the principles of this invention, and I therefore do not purpose limiting the patent granted, otherwise than necessitated by the prior art.

Having now described my invention, I claim:—

1. A process for making pills comprising forming charcoal pills, then applying to the pills a solution of cod liver oil extractives in a volatile solvent and evaporating the solvent.

2. A process for making pills comprising forming charcoal pills, then applying to the pills a solution of cod-liver oil extractives in ether and evaporating the ether.

3. A process for making pills comprising mixing charcoal with a solution of oleoresin of ginger in a volatile solvent, granulating and drying the mixture, forming the dry mixture into pills by pressure, then applying to the pills a solution of cod liver oil extractives in a volatile solvent and evaporating the solvent.

4. A process for making pills comprising mixing charcoal, reduced iron, zinc phosphide, berberine sulphate and strychnine sulphate, and a solution of oleoresin of ginger in ether, granulating and drying the mixture, forming the dry mixture into pills by pressure, then applying to the pills a solution of cod liver oil extractives in ether and evaporating the ether.

5. A method of forming a dry medicinal agent containing active extracted ingredients of cod-liver oil, which consists in causing a solution of said active ingredients to come into contact with a porous inert carrier which is insoluble in water, and allowing the solvent in said solution to evaporate at a suitable temperature.

6. A method of forming a dry medicinal agent containing active extracted ingredients of cod-liver oil, which consists in causing a solution of said active ingredients in ether to come into contact with a porous inert carrier which is insoluble in water, and allowing the solvent in said solution to evaporate at a suitable temperature.

7. A method of forming a dry medicinal agent in coherent tablet form and containing active extracted ingredients of cod-liver oil, which consists in causing connected particles of a porous inert carrier which is insoluble in water to contact with a solution of said active ingredients, allowing the solvent in said solution to evaporate at a suitable temperature, and binding said particles by a suitable binder whose action is effective at a suitable temperature.

8. A medicinal agent comprising a porous inert carrier insoluble in water and containing the absorbed residue from an evaporated solution of the active ingredients of cod-liver oil.

9. A medicinal agent comprising a tablet made of particles of a porous inert carrying material insoluble in water, said carrying material containing the absorbed residue from an evaporated solution of the active ingredients of cod-liver oil, said particles being pressed together and being connected by intermixed binding material.

10. The method of making pills comprising mixing an inert absorbent material insoluble in water with medicinal ingredients, forming the mixture into pill form, applying to the pills thus formed a solution of cod liver oil extractives in a volatile solvent, and evaporating the solvent.

11. The method of making pills which comprises mixing charcoal with medicinal ingredients, forming the mixture into pill form, applying to the pills thus formed a solution of cod liver oil extractives in ether, and evaporating the ether.

12. The method of making pills which comprises mixing together medicinal ingredients with a sufficient volume of an inert absorbent material insoluble in water to enable a thorough mixture, then adding more of said absorbent material and uniformly incorporating the same in the mixture, then adding a solution of a binding ingredient in a volatile solvent and thoroughly mixing the whole, forming the final mixture into pill form with just enough pressure to produce a coherent mass for each pill, so as not to destroy its porosity, then treating the pills thus formed with a solution of cod liver oil extractives in a volatile solvent, and evaporating the solvent.

13. A method of making cod liver oil pills, comprising forming the pills from a mass of an inert absorbent material insoluble in water, and in which a solution of cod liver oil extractives is absorbed.

14. A medicinal agent in tablet form and composed of an inert and absorbent excipient which is insoluble in water, and an absorbed extractive of cod liver oil contained in said excipient.

15. A process for making pills comprising mixing charcoal with medicinal ingredients, forming the mixture into pill form, then applying to the pills a solution of an ingredient containing the therapeutic principles of cod liver oil in a volatile solvent, and evaporating the solvent.

16. A process for making pills comprising forming pill bodies of an inert absorbent material insoluble in water, then applying to the pills a solution of a medicinal ingredient containing extractives of cod liver oil in a volatile solvent, and evaporating the solvent.

17. The process of preparing cod liver oil in pill or tablet form comprising providing a solution of therapeutic principles of cod liver oil in a volatile solvent, and absorbing said solution in an inert absorbent excipient insoluble in water and from which the pills or tablets are formed, and allowing the solvent to evaporate, so that said therapeutic principles are retained in the excipient substance after evaporation of the volatile solvent.

In witness whereof I hereunto subscribe my name to this specification.

BENJAMIN L. EICHER.